United States Patent [19]

Tokutomi et al.

[11] 4,230,401
[45] Oct. 28, 1980

[54] CAMERA FOCUS DETECTING DEVICE

[75] Inventors: Seijiro Tokutomi, Tokyo; Masao Jyojiki, Tsurugashima; Kazuo Nakamura, Tokyo, all of Japan

[73] Assignee: Asahi Kogaku Kogyo Kabushiki Kaisha, Tokyo, Japan

[21] Appl. No.: 971,122

[22] Filed: Dec. 19, 1978

[30] Foreign Application Priority Data

Dec. 22, 1977 [JP] Japan .................. 52-154730

[51] Int. Cl.³ .............................. G03B 7/08
[52] U.S. Cl. .................... 354/25; 354/31; 354/53; 354/60 L
[58] Field of Search .............. 354/25, 31, 60 E, 60 L, 354/53–56, 198, 195; 352/140; 250/201, 204; 355/56

[56] References Cited

U.S. PATENT DOCUMENTS 4,083,056  4/1978  Nakamura et al. .............. 354/25
4,126,871  11/1978  Tamura et al. .............. 354/25

FOREIGN PATENT DOCUMENTS 2746920  4/1979  Fed. Rep. of Germany .......... 354/25

Primary Examiner—L. T. Hix
Assistant Examiner—W. J. Brady
Attorney, Agent, or Firm—Sughrue, Rothwell, Mion, Zinn and Macpeak

[57] ABSTRACT

A focus detecting device in a camera having an optical member or an optical system for obtaining two images from an object and an optical member for displacing said two images in opposite directions or displacing one of said two images. Two minute photoelectric conversion element groups are used for converting variations in light quantity of portions of the object into electrical signals. A photographing lens projects the image of the object onto the minute photoelectric conversion element groups. A circuit calculates outputs $$V_{out-1} = \sum_{m=1}^{n-1} |i_m - i_{m+1}| \text{ and } V_{out-2} = \sum_{m=1}^{n-1} |i_m' - i_{m+1}'|$$

from the outputs of minute photoelectric conversion elements forming the minute photoelectric conversion element groups. A circuit which has a first calculation function for calculating $V_{out-3} = V_{out-1} + V_{out-2}$ and a second calculation function for calculating $V_{out-4} = V_{out-1} - V_{out-2}$ so that when $V_{out-3}$ becomes higher than a predetermined value, different outputs are produced under conditions that $V_{out-4} > \epsilon_1$, $\epsilon_1 \geq V_{out-4} \geq \epsilon_2$, and $\epsilon_2 > V_{out-4}$. A display produces different displays according to the different outputs where n is the number of the minute photoelectric conversion elements forming each of the two minute photoelectric conversion element groups, m is a number of a minute photoelectric conversion element, i is the output of a minute photoelectric conversion element in one of the two minute photoelectric conversion element groups, i' is the output of a minute photoelectric conversion element in the other minute photoelectric conversion element group, $\epsilon_1$ and $\epsilon_2$ are predetermined constants.

21 Claims, 9 Drawing Figures

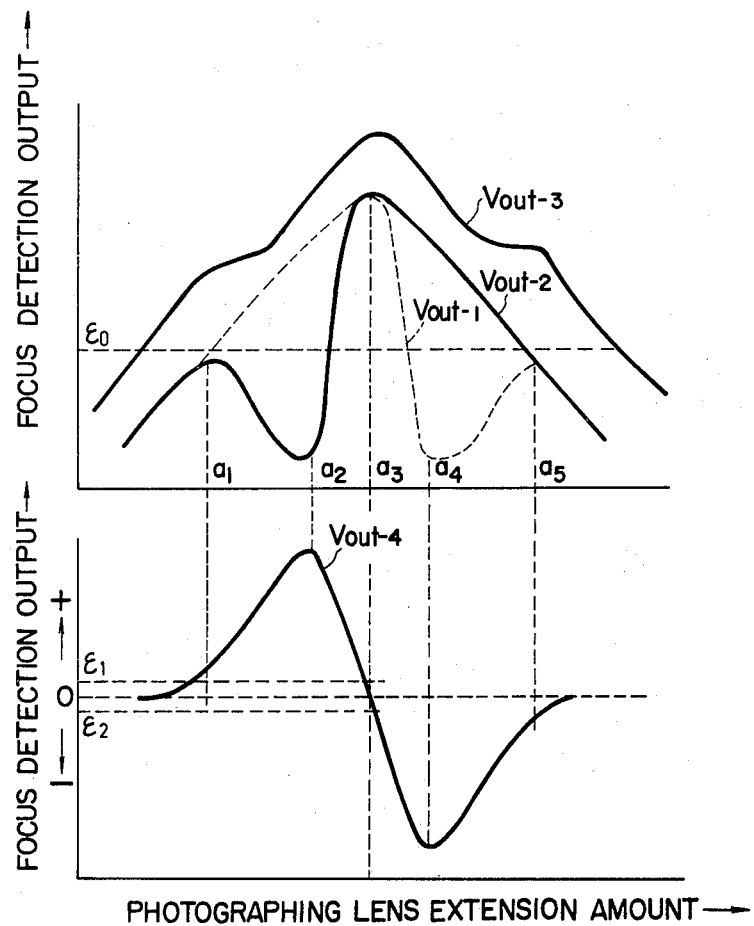
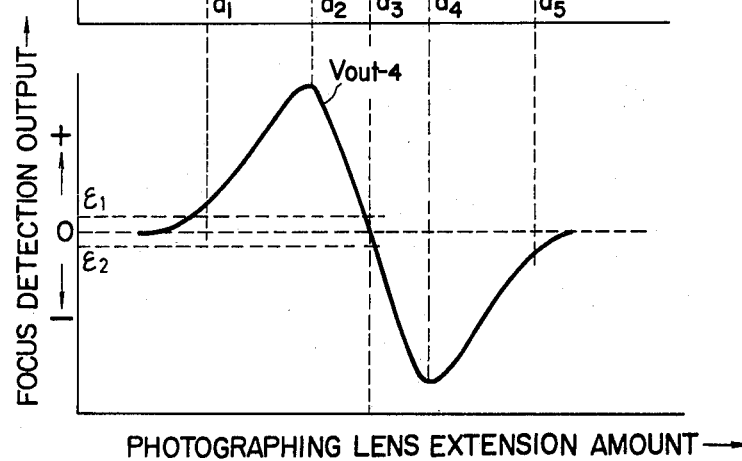
FIG. 3(a)
FIG. 3(b)
PHOTOGRAPHING LENS EXTENSION AMOUNT →
FIG. 5
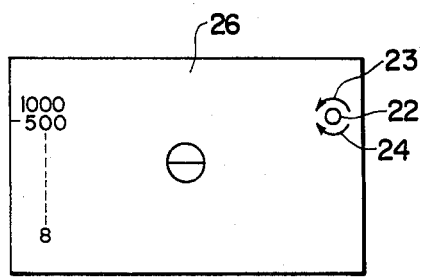

CAMERA FOCUS DETECTING DEVICE

BACKGROUND OF THE INVENTION

This invention relates to a focus detecting device in a camera in which the image of an object is divided into two parts by means of a prism, a half mirror, and a mirror. Alternatively, the same image of an object is received at two places in accordance with a so-called range-finder system. By utilizing the fact the amount of mutual displacement of the two parts of the image becomes zero when correct focalization is obtained, the direction in which the photographing lens should be turned or moved for the correct focalization is informed to the photographer by display means such as light emission diodes or the like even if the initial focus position is remote from the correct focalization position.

A number of electrical focus detection methods have been proposed in the art, in which the same image of an object is processed in two optical paths according to variation of spatial frequency or variations in constrast of the image. The two images thus obtained are made to coincide with each other when the correct focalization is obtained. Among these conventional electrical focus detecting methods, the object of most methods resides in obtaining the correct focalization automatically. Accordingly, in these conventional methods, the photographer only knows that the correct focalization has been obtained. Thus, the conventional methods are still unsatisfactory to photographers in many respects.

Heretofore, the focalization can be achieved by moving a photographing lens in presently available camera systems. However, in the case of the aforementioned electrical focus detecting methods, it is necessary to move the photographing lens by means of, for instance, an electric motor. It is therefore a requirement of such systems to provide such an electric motor, a motor drive device and a battery, all of which leads to an increase in size of the camera. Thus, the use of such a camera is necessarily limited and cumbersome.

In addition, there are other factors to consider in the focalization process. At present, there are avilable a variety of optical focus detecting methods in which, for instance, a mat surface, a microprism or a split-prism are utilized. In any of these conventional optical focus detecting methods, the photographer recognizes the image of an object as an analog variation, or a continuous variation to thereby detect the correct focalization. Accordingly, the detection of correct focalization involves personal errors based on user skills. These are due to photographer's personal ability such as visual power, skill in focalization and sense of depth of field. The techniques are therefore not suitable for beginners, or children.

Since electrical focus detecting methods have been proposed in order to overcome this difficulty, completely automatic focalization is not necessarily required. That electrical lens movement is not always required. What is necessary is an indication as to how correct the focalization can be achieved. That is, if display indicating conditions of rear focalization, the front focalization and the correct focalization can be made during operation of the photographing lens as in present camera systems, then any photographer can obtain the correct focalization readily irrespective of his personal ability.

SUMMARY OF THE INVENTION

In view of the foregoing, an object of this invention is to provide a focus detecting device in a camera, in which the state of focalization is provided to a photographer by displaying it with a meter or light emission diodes so that any one can readily obtain the correct focalization.

It is another object of this invention to provide a focusing system in which the electronic focus detecting device is relatively simple in construction, and has no movable components.

It is yet another object of this invention to define a system useable in an automatic focus detecting device formed according to the technical concept of this invention.

These and other objects of this invention are accomplished by means of a novel focus detecting device.

The device comprises an optical member or an optical system for obtaining two images from an object and an optical member for displacing said two images in opposite directions or displacing one of said two images. Two minute photoelectric conversion element groups are employed for converting variation in light quantity of portions of the object into electrical signals. A photographing lens is used for projecting the image of said object onto the minute photoelectric conversion element groups. A circuit calculates outputs $$V_{out-1} = \sum_{m=1}^{n-1} |i_m - i_{m+1}'|\ \ V_{out-2} = \sum_{m=1}^{n-1} |i_m' - i_{m+1}|$$

from the outputs of minute photoelectric conversion elements forming the minute photoelectric conversion element groups. A circuit which has calculation circuits for calculating $V_{out-3} = V_{out-1} + V_{out-2}$ and $V_{out-4} = V_{out-1} - V_{out-2}$ so that when $V_{out-3}$ becomes higher than a predetermined value, different outputs are produced under conditions that $V_{out-4} > \epsilon_1$, $\epsilon_1 \geq V_{out-4} \geq \epsilon_2$, and $\epsilon_2 > V_{out-4}$. A display effectuates different outputs according to the different outputs, where n is the number of the minute photoelectric conversion elements forming each of the two minute photoelectric conversion element groups, m is a number of a minute photoelectric conversion element, i is the output of a minute photoelectric conversion element in one of the two minute photoelectric conversion element groups, i' is the output of a minute photoelectric conversion element in the other minute photoelectric element group.

This invention will be discribed in greater detail with respect to the accompanying drawings and the description of the preferred embodiment that follows.

BRIEF DESCRIPTION OF THE DRAWINGS

FIG. 3(a) is a graphical representation indicating variations of focus detecting outputs $V_{out\text{-}1}$, $V_{out\text{-}2}$ and $V_{out\text{-}3}$ with respect to positions of extension of a photographing lens;

FIG. 3(b) is a graphical representation indicating variation of an focus detecting output $V_{out\text{-}4}$ with respect to positions of extension of the photographing lens;

FIG. 5 shows one example of a display in a finder utilizing the focus detecting outputs according to the invention.

DESCRIPTION OF THE PREFERRED EMBODIMENT

One preferred embodiment of this invention will now be described with reference to the accompanying drawings.

Figure 1:
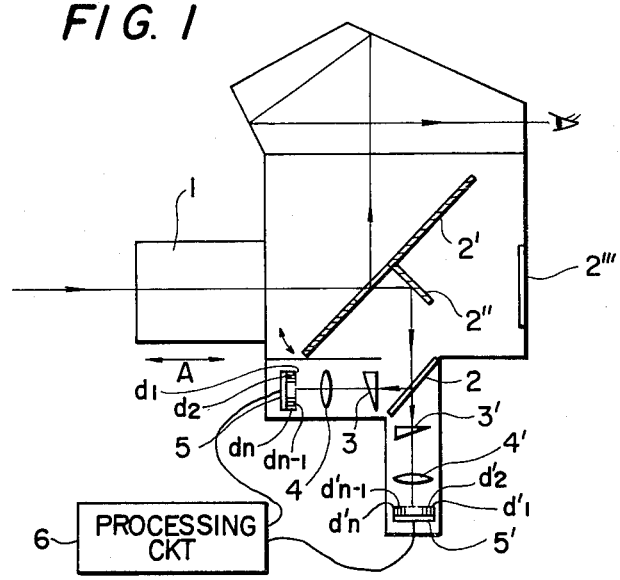
FIG. 1 is an explanatory diagram showing one example of an optical system according to an electrical focus detecting method of this invention.

FIG. 1 shows an optical system according to an electronic focus detecting method of this invention, which is incorporated in a single lens reflex (SLR) camera. In this optical system, a half mirror 2 is employed as an optical member for dividing the image of an object into two parts, and wedge-type prisms are employed as optical means for displacing the image of the object in the opposite directions.

Referring to FIG. 1, reference numeral 1 designates a photographing lens for forming the image of the object in the vicinities of wedge-type prisms 3 and 3′. Reference numeral 2 is a half mirror and reference numeral 2′ is a total reflection mirror having a half mirror in the central portion (the arrow indicating the motion thereof). Reference numeral 2″ is a total reflection mirror; and reference numeral 2‴ is the surface of film in the camera.

Figure 4:
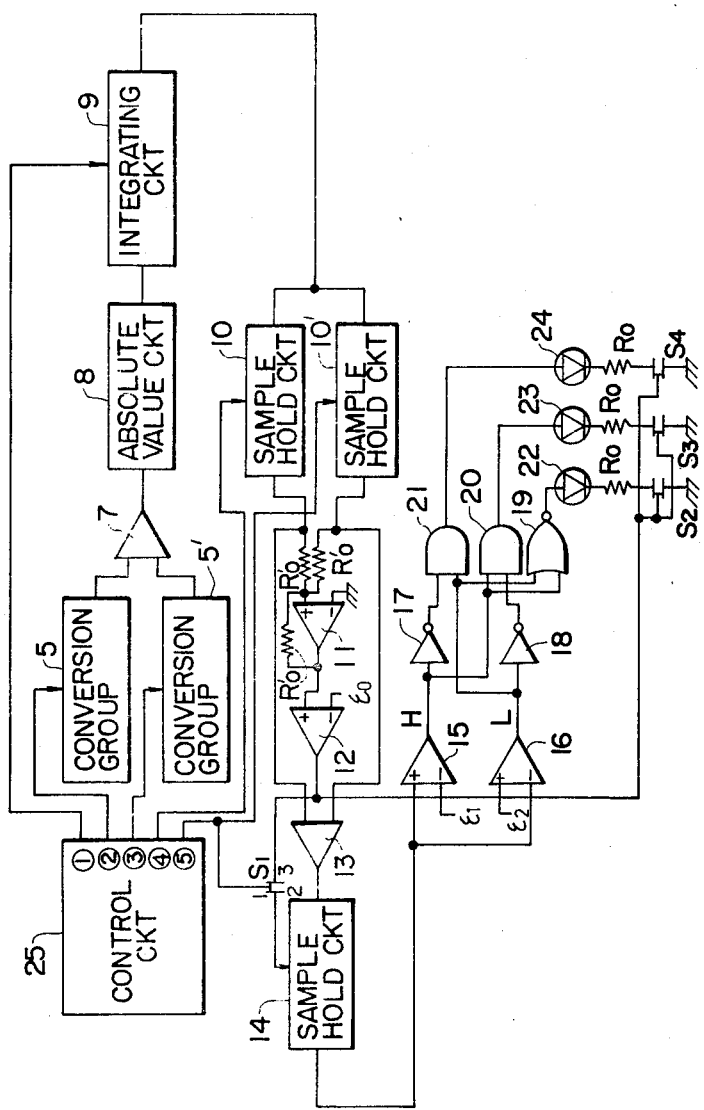
FIG. 4 is a block diagram showing one example of a processing circuit in an electrical focus detecting device according to the invention.

The wedge-type prisms 3 and 3′ are disposed at positions optically equivalent to the position of the film surface 2‴ in the camera having the electronic focus detecting device. Upon focalization of the image of the object, the image of the object is formed on the wedge-type prisms 3 and 3′. Reference numerals 4 and 4′ designate image forming lenses for projecting the object image formed on the prisms 3 and 3′ onto minute photoelectric conversion element groups 5 and 5′, respectively. Each of the minute photoelectric conversion element groups 5 and 5′ is used to convert the optical variation of the object image into an electrical signal. Reference numeral 6 designates a processing device adapted to calculate the outputs of the minute photoelectric conversion element groups 5 and 5′ (hereinafter referred to merely as "the photoelectric conversion element groups 5 and 55‴") thereby to carry out the electrical focus detection. The block diagram of the processing device 6 is shown in FiG. 4 and will be described herein in detail.

The arrow A for the photographing lens indicates the direction of movement of the photographing lens 1. While the lens 1 is moved either inward or outward in the direction of the arrow, focalization is obtained. Reference characters $d_1$ through $d_n$, and $d_{1'}$ through $d_{n'}$ designate photoelectric conversion elements forming the above-described photoelectric conversion element groups 5 and 5′. These elements are equal to each other in photoelectric characteristics and in light receiving area. This is shown in FIG. 2. The elements $d_1$ and $d_{1'}$, the elements $d_2$ and $d_{2'}$ and so on optically correspond to each other.

Figure 2A:
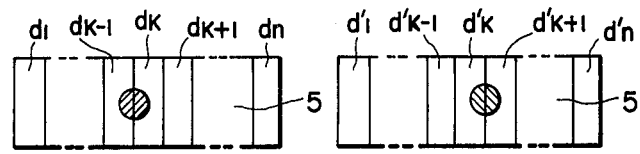
FIG. 2(a) is a diagram showing the images of an object on photoelectric conversion element groups 5 and 5' in the case where the focus position is in front of (or in the rear of) the correct focalization position.
Figure 2B:
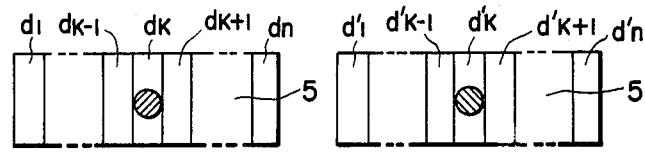
FIG. 2(b) is a diagram showing the images of the object on the photoelectric conversion element groups 5 and 5' in the case where the correct focalization is obtained.
Figure 2C:
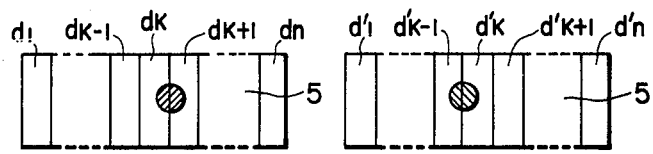
FIG. 2(c) is a diagram showing the images of the object on the photoelectric conversion element groups 5 and 5′ in the case where the focus position is in the rear of (or in front of) the correct focalization position.

FIG. 2 shows the images of the object (the hatched circles) formed on the photoelectric coversion element groups 5 and 5′. FIG. 2(a) shows the case where the focus position is in front of (or in the rear of) the photoelectric conversion element group. FIG. 2(b) shows the case where focalization is obtained on the photo-electric conversion element group. As shown, the image is centered in the array. FIG. 2(c) shows the case where the focus position is in the rear of (or in front of) the photoelectric conversion element group.

FIG. 3 is a graphical representation indicating variation of focus detection output with amount of extension of photographing lens 1. FIG. 3(a) indicates the following outputs:

$$V_{out\text{-}1} = \sum_{m=1}^{n-1} |i_m - i_{m+1}'|$$
$$V_{out\text{-}2} = \sum_{m=1}^{n-1} |i_m' - i_{m+1}|$$
$$V_{out\text{-}3} = V_{out\text{-}4} + V_{out\text{-}2}$$

FIG. 3(b) indicates the following output:

$$V_{out\text{-}4} = V_{out\text{-}1} - V_{out\text{-}2}$$

In FIG. 3, $\epsilon_0$ is the voltage for determining a range in which the output $V_{out\text{-}4}$ is detected, and $\epsilon_1$ and $\epsilon_2$ are the voltages which meet an expression $\epsilon_1 \geq V_{out\text{-}4} \geq \epsilon_2$ and at which a focalization signal is provided. In the above-described expressions, i is the output corresponding to the incident light quantity of each photoelectric conversion element and the suffix m is the element number of each photoelectric conversion element.

FIG. 4 is a block diagram of the processing circuit (shown in FIG. 1) of the focus detecting device according to the invention. The processing circuit, as shown in FIG. 4, comprises: a differential circuit 7 recieving the output from the conversion element groups 5 and 5′ and an absolute value circuit 8. An integrating circuit 9 provides inputs to sample hold circuits 10 and 10′. An addition circuit 11, a comparator 12, a differential circuit 13, and a sample hold circuit 14 are shown in serial connections. Comparators 15 and 16 receive the output of circuit 14 and inverters 17 and 18 provide parallel inputs to a NOR circuit 19, AND circuits 20 and 21. Display elements 22, 23 and 24 can be light emission diodes or other display devices. A control circuit 25 is employed for controlling the aforementioned various circuit elements. In the control circuit 25, reference symbols ① through ⑤ designate various control signals. FIG. 4 shows switches, $S_1$, $S_2$, $S_3$ and $S_4$. These may be 3-terminal analog switches (see $S_1$) and it is assumed that the terminals 2 and 3 are short-circuited when the terminal 1 is at a logical high level (hereinafter referred to merely as "H", when applicable.) The terminals 2 and 3 are in open state when the terminal 1 is at a logical low level (hereinafter referred to merely as "L", when applicable.) In FIG. 4, reference characters $R_O$ and $R_{O'}$ designate resistors either input or feed-back types.

FIG. 5 shows on example of a technique for displaying a focus detection state according to the invention in a view finder 26. In this view finder, a shutter speed displaying section is provided on the left-hand side and a focalizing section utilizing a split-prism shown in the central position. This is conventional in SLR cameras. Furthermore, however in the upper right portion of the view finder 26 there is provided a front focalization displaying element (or a rear focalization displaying element) 23, a correct focalization displaying element 22, and a rear focalization displaying element (or a front focalization displaying element) 24, which are, for instance, light emission diodes. Elements 23 and 24 would, by arrow instruct the user which way to rotate the barrel of the lens.

Figure 6:
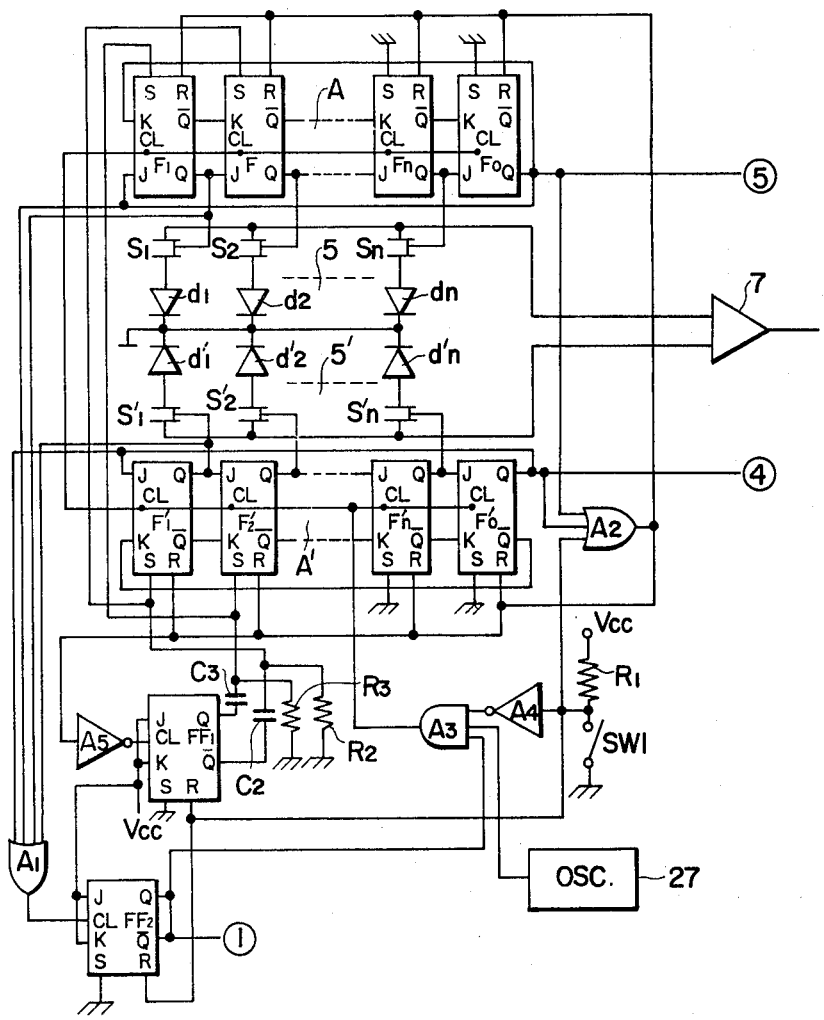
FIG. 6 is a block diagram showing one example of a control circuit shown in FIG. 4.

FIG. 6 shows one example of the control circuit 25 in FIG. 4. The control circuit comprises ring counters A and A'; J-K flip-flops $F_1$ through $F_n$, $F_{1'}$ through $F_{n'}$, $F_0$, $F_{0'}$, $FF_1$, $FF_2$; switches $s_1$ through $s_n$, and $s_{1'}$ through $s_{n'}$ such as analog switches; OR circuits $A_1$ and $A_2$, an AND circuit $A_3$; inverters $A_4$ and $A_5$, an oscillator 27 and a focus detection start switch $SW_1$. In FIG. 6, reference characters R and C designate a resistor and capacitor elements respectively. Furthermore, a supply voltage Vcc is at "H", and the ground is at "L". In FIGS. 4 and 6, like parts are designated by like reference numerals or characters.

It will be noted that the operation and symbols for digital logical elements in this specification are similar to those of a C-MOS manufactured by RCA company.

The operation of the focus detecting device according to the invention will now be described with reference to FIGS. 1 through 6.

Referring to FIG. 1, in order to perform the electronic focus detection, the image of the object passes through the photographing lens 1 and the total reflection mirror 2' having the half mirror in the central portion and is then reflected by the total reflection mirror 2". The image thus reflected is divided by the half mirror 2 into two images, which are formed in the vicinities of the wedge-type prisms 3 and 3'. At the time of the correct focalization, the images on the wedge-type prisms 3 and 3' are passed through the image forming lenses 4 and 4', so that identical images are projected onto the photoelectric conversion element groups 5 and 5', respectively. That is, the same portions of the object image are projected onto the photoelectric conversion elements $d_1$ and $d_{1'}$, $d_2$ and $d_{2'}$, ..., $d_n$ and $d_{n'}$, respectively.

When correct focalization is not obtained (such variation in focus position being due to the movement, in the direction of the arrow A of the photographing lens 1) the image of the object is not on the wedge-type prisms 3 and 3'. Since the prisms 3 and 3' are inclined in the opposite directions, the object images on the photoelectric conversion element groups 5 and 5' are displaced in the opposite directions. Furthermore, because the image forming lenses 4 and 4' are arranged so that they will project the object images formed on the prisms 3 and 3' onto the photoelectric conversion element groups 5 and 5', respectively, the object images on the photoelectric conversion element groups 5 and 5' become more unclear as the deviation from the correct focalization position is increased.

FIG. 2 is a diagram showing variations of the object images on the photoelectric conversion element groups 5 and 5'. FIGS. 2(a) and (c) show the cases where the focus position is remote from the correct focalization position, but the image is not particularly unclear. A common method of reducing the degree of image lack of clarity is to adjust the depth of field of the image forming lenses 4 and 4'.

FIG. 2(a) illustrates the case where the focus position is in front of (or in the rear of) the correct focalization position. If the output $$V_{out-1} = \sum_{m=1}^{n-1} |i_m - i_{m+1}'|$$

and the output $$V_{out-2} = \sum_{m=1}^{n-1} |i_m' - i_{m+1}|$$

are considered with respect only to the vicinity of the $(K-1)$th, K'th and $(K+1)$th elements of the photoelectric conversion element groups 5 and 5', then $i_0 > i_{00}$, where $i_0$ is the output of an element having the hatched circle which is the object image. $i_{00}$ is the output of an element having no hatched circle. (In this case, the output of each of the remaining photoelectric conversion elements is $i_{00}$). In this case, the output $V_{out-1}$ is the sum of the outputs of the photoelectric conversion elements:

$$|d_{k-2}-d'_{k-1}|+|d_{k-1}-d'_k|+|d_k-d'_{k+1}|+|d_{k+1}-d'_{k+2}|.$$

That is, $$V_{out-1} = |i_{00}-i_{00}|+|i_{0/2}-i_{0/2}|+|i_{0/2}-i_{0/2}|+|i_{00}-i_{00}|=0$$

on the other hand, the output $V_{out-2}$ is the sum of the difference outputs of the photoelectric conversion elements:

$$|d'_{k-2}-d_{k-1}|+|d'_{k-1}-d_k|+|d'_k-d_{k+1}|+|d'_{k+1}-d_{k+2}|$$

That is, $$V_{out-2} = |i_{00} - i_{0/2}| + |i_{00} - i_{0/2}| + |i_{0/2} - i_{00}| + |i_{0/2} - i_{00}|$$
$$= 4|i_{0/2} - i_{00}| > 0.$$

Since, $V_{out-3} = V_{out-1} + V_{out-2}, V_{out-3} = 4|i'_{0/2} - i_{00}| > 0.$
Since $V_{out-4} = V_{out-1} - V_{out-2}$, then $V_{out-4} = -4|i_{0/2} - i_{00}| < 0.$ FIG. 2(b) shows the case where the correct focalization is obtained. As in the above-described case, the outputs $V_{out-1}$, $V_{out-2}$, $V_{out-3}$ and $V_{out-4}$ can be obtained as follows:

$$V_{out-1} = |i_{00} - i_{00}| + |i_{00} - i_0| + |i_0 - i_{00}| + |i_{00} - i_{00}|$$
$$= 2|i_0 - i_{00}| > 0$$
$$V_{out-2} = |i_{00} - i_{00}| + |i_{00} - i_0| + |i_0 - i_{00}| + |i_{00} - i_{00}|$$
$$= 2|i_0 - i_{00}| > 0$$
$$V_{out-3} = 4|i_0 - i_{00}| > 0$$
$$V_{out-4} = 2|i_0 - i_{00}| - 2|i_0 - i_{00}| = 0$$

FIG. 2(c) illustrates the case in contrast to FIG. 2(a) where the focus position is in the rear of (or in front of) the correct focalization position. As in the above-described cases, the outputs can be obtained as follows:

$$V_{out-1} = |i_{00} - i_{0/2}| + |i_{00} - i_{0/2}| + |i_{0/2} - i_{00}| + |i_{0/2} - i_{00}|$$
$$= 4|i_{0/2} - i_{00}|$$
$$V_{out-2} = |i_{00} - i_{00}| + |i_{0/2} - i_{0/2}| + |i_{0/2} - i_{0/2}| + |i_{00} - i_{00}|$$

-continued $$= 0$$
$$V_{out\text{-}3} = 4|i_{0/2} - i_{00}|$$
$$V_{out\text{-}4} = 4|i_{0/2} - i_{00}| > 0$$

The outputs $V_{out\text{-}3}$ and $V_{out\text{-}4}$ in FIGS. 2(a)–(c) will be subjected to comparison. Since $i_0 > i_{00}$, with respect to the output $V_{out\text{-}3}$, part (b) > part (a) > 0 and part (b) > part (c) > 0. In addition, if the object image becomes unclear when the correct focalization is not obtained, the difference in each of the above-described expression is increased. With respect to the output $V_{out\text{-}4}$, part (a) < 0, part (b) = 0, and part (c) > 0.

FIGS. 3(a), (b) and (c) indicate variations of the aforementioned outputs with respect to various positions of extension of the photographing lens 1. FIG. 3(a) indicates variations of the outputs $V_{out\text{-}1}$, $V_{out\text{-}2}$ and $V_{out\text{-}3}$ (the focus detection output ratio of $V_{out\text{-}1}$ or $V_{out\text{-}2}$ to $V_{out\text{-}3}$ being 1:1.) The results of FIGS. 2(a) and (c) described above indicate the outputs at the points $a_4$ and $a_2$, while the result of FIG. 2(b) indicates the output at the point $a_3$. FIG. 3(b) shows a variation of the output $V_{out\text{-}4}$.

The output $V_{out\text{-}2}$ in FIG. 3(a) will now be described. On the left-hand side of the point $a_1$, the object image becomes unclear because the focus position is remote from correct focalization position $a_3$, and therefore the output $V_{out\text{-}2}$ approaches zero (0). In the vicinity of the point $a_1$, the degree of image uncleaness is reduced, and therefore the output is increased. However, when the two object images begin to coincide with each other gradually, the output is decreased. The sum of these two outputs has an external value at point $a_2$. The output becomes zero (0) as described with reference to FIG. 2, however, it does not become completely zero (0) because there are involved errors such as the fluctuation in characteristic of the elements. The correct focalization is obtained at the point $a_3$.

At this point, the contrast is maximum, and therefore the sum $V_{out\text{-}1}$ of the difference outputs of the adjacent elements becomes maximum. As the position of extension of the photographing lens is moved beyond the point $a_3$, the object images are displaced in the opposite directions and becomes unclear. Thus, the output is decreased gradually as the position of extension of the photographing lens is advanced to the points $a_4$, $a_5$ and so on.

The variation of the output $V_{out\text{-}2}$ is as described above. The $V_{out\text{-}1}$ is symmetrical with the $V_{out\text{-}2}$ with respect to the point $a_3$, and carries out the variation as indicated in FIG. 3(a). On the other hand, the output $V_{out\text{-}3}$ varies to be a maximum value at point $a_3$ because $V_{out\text{-}3} = V_{out\text{-}1} + V_{out\text{-}2}$. FIG. 3(b) shows the variation of the output $V_{out\text{-}4}$. The value of the output $V_{out\text{-}4}$ is positive on the left-hand side of the point $a_3$, zero (0) at the point $a_3$, and negative on the right-hand side of the point $a_3$. In other words, as described with reference to FIG. 2(b), the output $V_{out\text{-}4} = 0$ at the point $a_3$ that is, the correct focalization position. The variations of the outputs $V_{out\text{-}1}$ through $V_{out\text{-}4}$ according to the invention are as described above. Now, the value $\epsilon_1$ and $\epsilon_2$ will be described with reference to FIG. 4.

In addition, the processing circuit adapted to carry out the focus detection, according to this invention, by utilizing the various outputs will be also described with reference to FIG. 4.

As was described before, FIG. 4 is a block diagram of the processing circuit 6 shown in FIG. 1. First, the output differences of the elements in the photoelectric conversion element groups 5 and 5' are obtained by the differential circuit 7, and then the output $$V_{out\text{-}1} = \sum_{m=1}^{n-1} |i_m - i_{m+1}'|$$

is obtained by means of the absolute value circuit 8 and the integrating circuit 9. Thereafter, the output thus obtained is applied to the sample hold circuit 10 such as IH5110 made by Intersil Inc.

Similarly as in the above-described case, the output $$V_{out\text{-}2} = \sum_{m=1}^{n-1} |i_m' - i_{m+1}|$$

is applied to the sample hold circuit 10'. The outputs of the sample hold circuits 10 and 10' are applied to the addition circuit 11. As a result the output $V_{out\text{-}3}$ is obtained. At the same time, the output $V_{out\text{-}4}$ is obtained by the differential circuit 13. If, in this case, the output $V_{out\text{-}3}$ is greater than the value $\epsilon_0$ in FIG. 3(a), the output of the comparator 12 is raised to "H". This output is applied, as a sample signal, to the sample hold circuit 14 through the switch $S_1$. As a result the output $V_{out\text{-}4}$ is obtained at the output of the sample hold circuit 14, while the switches $S_2$, $S_3$ and $S_4$ are placed in short-circuit state by the application of the "H" output of the comparator 12.

When the output of the sample hold circuit 14, i.e., the outpput $V_{out\text{-}4}$ is greater than the value $\epsilon_1$ in FIG. 3(b), the output of the comparator 15 is raised to "H", while the output of the comparator 16 is set to "L". As a result, the output of the AND circuit 20 is raised to "H" with the aid of the inverter 18, whereby the display element 23 such as a light emission diode is turned on (emitting light).

When the output $V_{out\text{-}4}$ is defined by an expression $\epsilon_1 > V_{out\text{-}4} > \epsilon_2$, the outputs of the comparators 15 and 16 respectively set to "L". Therefore, the output of the NOR circuit 19 is raised to "H" to operate the light emission element 22 such as a light emission diode.

These operations are controlled by the control circuit 25. That is, the control circuit 25 applies various control signals to the various circuit elements. The control signal (2) is employed to combine the elements in the photoelectric conversion element groups 5 and 5', namely, the elements $d_1 - d_{2'}, \ldots, d_{n-1} - d_{n'}$. The control signal (3) is used to combine the elements $d_{1'} - d_{2'}, \ldots, d_{n-1'} - d_n$. The control signal (1) causes integration of the difference outputs of the elements combined by the control signals (2) and (3). That is, it is used to obtain $$V_{out\text{-}1} = \sum_{m=1}^{n-1} |i_m - i_{m+1}'| \text{ and } V_{out\text{-}2} = \sum_{m=1}^{n-1} |i_m' - i_{m+1}|.$$

The control signal (4) is a sample signal which, after the output $V_{out\text{-}1}$ is obtained, holds the value thereof. The control signal (5) is a sample signal which, after the output $V_{out\text{-}2}$ is obtained, holds the value thereof. In the case where $V_{out\text{-}3}$ is less than $\epsilon_0$ the switches $S_2$, $S_3$ and $S_4$ are not short-circuited, and therefore the display elements 22, 23 and 24 emit no light.

If the incident luminous fluxes of the photoelectric conversion elements are represented by $F_1$ through $F_n$, and $F_{1'}$ through $F_{n'}$, then the outputs $i_1$ through $i_n$ and $i_{1'}$ through $i_{n'}$ of the photoelectric conversion elements described above can be expressed as follows:

$$i_1 = K_1 \cdot F_1, \; i_2 = K_2 \cdot F_2, \ldots i_n = K_n \cdot F_n, \; i'_1 = K'_1 \cdot F'_1, \ldots i'_n = K'_n \cdot F'_n.$$

Alternatively, $i_1 = L_1 \log_e F_1 + \alpha_1 \ldots i_n = L_n \log_e F_n + \alpha_n$, $i'_1 = L'_1 \log_e F'_1 + \alpha_1 \ldots i'_n = L'_n \log_e F'_n + \alpha'_n$, where, $K_1 \sim K_n$, $K'_1 \sim K'_n$, $L_1 \sim L_n$, $L'_1 \sim L'_n$, $\alpha_1 \sim \alpha_n$, and $\alpha'_1 \sim \alpha'_n$ are the constants.

Thus, the state of the focalization position can be given to the photographer according to the invention.

FIG. 5 shows one example of a system where the focalization position state is displayed in the view finder 26. When the lens extending position is sufficiently remote from the correct focalization position in FIG. 3 ($V_{out-3} < \epsilon_0$), no focalization display is made in the view finder. In the case of $V_{out-3} > \epsilon_0$ and $V_{out-4} > \epsilon$, the display element 23 emits light. If, in this case, the display element 23 is designed in the form of an arrow so that the focus position will approach the correct focalization position ($V_{out-3} > \epsilon_0$ and $\epsilon_1 \geq V_{out-4} \geq \epsilon_2$). By turning the photographing lens 1 in the direction of the arrow, the direction in which the photographing lens 1 the correct focalization can be readily detected. When the correct focalization is obtained, the display element 22 emits light, but the remaining display elements 23 and 24 in the form of arrows do not emit light. Therefore, it can be ascertained that the correct focalization has been obtained. When the correct focalization position is passed, the display element 24 emits light. Since the direction of the arrow of the display element 24 is opposite to the direction of the arrow of the display element 23, the photographing lens 1 should be rotated in the opposite direction. If the display elements are arranged as described above, the correct focalization can be readily obtained. In the embodiment of the invention described above, only three kinds of display are used. However, the invention is not limited thereto or thereby. That is, the display may be designed to display the case where the current focus position of the lens is considerably remote from the correct focalization. Also, other forms of display may be used to indicate near or far focal positions.

FIG. 6 shows one example of the control circuit 25 in FIG. 4 in detail. The theoretical operation of the control circuit 25 will first be described. When the focus detection start switch $SW_1$ is in open state, the J-K flip-flops in the groups A and A' and the J-K flip-flops $FF_1$ and $FF_2$ are in reset state, and their terminals Q are at "L". The signal from the oscillator circuit 27 is at "L" because the remaining input of the AND circuit $A_3$ is at "L". When the switch $SW_1$ is closed, the reset states of the J-K flip-flops are released and the output of the OR circuit $A_2$ is set to "L". This "L" output is applied through the inverter $A_5$ to the terminal CL of the J-K flip-flop $FF_1$.

Thus, the terminal CL of the J-K flip-flop $FF_1$ is raised to "H" from "L". Therefore, the terminal Q of the J-K flip-flop $FF_1$ is raised to "H". The terminals S of the J-K flip-flops $F_1$ and $F_{2'}$ are momentarily raised to "H" with a slight delay because of the capacitor $C_3$ and the resistor $R_3$. Therefore their terminals Q are also raised to "H". The switches $s_1$ and $s_{2'}$ are closed, and an output $i_1-i_{2'}$ is provided by the differential circuit 7.

On the other hand, at the same time, the terminal Q of the J-K flip-flop $FF_2$ is set to "H", the integrating circuit 9 is therefore operated to start its integration, and the signal of the oscillator circuit 27 is applied to the terminals CL of the J-K flip-flops in the ring counters A and A'. As a result, the switches $s_2$ and $s_{3'}$ are closed and an output $i_2-i_{3'}$ is provided by the differential circuit 7. Thus, outputs $i_3-i_{4'}, \ldots, i_{n-1}-i_{n'}$ are successively provided by the differential circuit 7 in response to the pulse signal from the oscillator circuit 27.

Next, when the terminal Q of the J-K flip-flop $F_{O'}$ is set to "H" in response to the pulse signal from the oscillator circuit 27, the terminal Q of the J-K flip-flop $FF_2$ is set to "L" with the aid of the OR circuit $A_1$. As a result, the operation of the integrating circuit 9 is suspended. When application of the pulse signal from the oscillator circuit 27 is suspended, the control signal ④ is provided. Since the control signal ④ is applied through the OR circuit $A_2$ to the J-K flip-flops in the groups A and A' to reset these flip-flops. Thus, the terminal $\overline{Q}$ of the J-K flip-flop $FF_1$ is set to "H" with the aid of the inverter $A_5$.

Therefore, the terminals Q of the J-K flip-flops $F_2$ and $F_{1'}$ are set to "H" with a slight delay due to the operation of the resistor $R_2$ and the capacitor $C_2$. The switches $s_2$ and $s_{1'}$ are closed and therefore an output $i_{1'}-i_2$ is provided by the differential circuit 7. At the same time, the terminal Q of the J-K flip-flop $FF_2$ is set to "H" and the integrating circuit 9 starts its operation. The pulse signal from the oscillator circuit 27 is applied to the terminals CL of the J-K flip-flops in the groups A and A'. Thus, outputs $i_{2'}-i_3, \ldots, i_{n-1'}-i_n$ are successively produced by the differential circuit 7. In response to the next pulse, the terminal Q of the flip-flop $F_0$ is set to "H", the sample control signal ⑤ is generated, the J-K flip-flops in the groups A and A' are reset and the terminal Q of the J-K flip-flop $FF_2$ is set to "L". Also, the operation of the integrating circuit 9 is suspended and application of the pulse from the oscillator circuit 27 is suspended (the operation up to this being one focus detection). At the same time, the terminal Q of the flip-flop $FF_1$ is set to "H", and the terminals Q of the flip-flops $F_1$ and $F_{2'}$ are set to "H". Thus, the above-described operation is repeated.

The control signals ② and ③ are employed to control the switches $s_1-s_n$ and $s_{1'}-s_{n'}$, respectively. In FIG. 6, the supply voltage $V_{cc}$ is at "H", while the ground is at "L". The electronic focus detection can therefore be effectively controlled by the circuit as described above.

Thus, as was described briefly in the introductory part herein according to this invention, the electronic focus detection and display device is made up of the relatively simple optical system and circuit to readily permit the photographer to detect and obtain the correct focalization. This technique is a considerable improvement when compared with a focus detecting device employing the conventional method in which the focus is optically detected. Also, this system eliminates the need for drive motors and the like by allowing manual operation of the lens.

Also, instead of the image forming lenses 4 and 4', lens systems (such as cylindrical lenses) whose magnifications are greater in the direction perpendicular to the direction of the photoelectric conversion element group 5 or 5' than in the said direction of the photoelectric conversion element group 5 or 5' can be employed and the detection performance can be improved as much. Self-scanning type image sensors, photodiodes or photo-transistors may be used for the photoelectric conversion element groups 5 and 5'.

In the above description, $$V_{out\text{-}1} = \sum_{m=1}^{n-1} |i_m - i_{m+1}'|;$$

however, it may be modified into $$V_{out\text{-}1} = \sum_{m=1}^{n-2} |i_m - i_{m+2}'| \text{ or } V_{out\text{-}1} = \sum_{m=1}^{n-3} |i_m - i_{m+3}'|.$$

Of course, in this case, $V_{out\text{-}2}$ should be modified similarly.

It is also apparent that other modification may be made without departing from the scope of this invention.

We claim:

1. A camera focus detecting system comprising; optical means for obtaining two images from an object; an optical member for displacing at least one of said two images relative to each other; means including photoelectric conversion elements forming two groups for converting variations in light quantity of portions of said object into electrical output signals; a photographing lens for projecting the image of said object onto said photoelectric conversion element means; circuit means for calculating outputs $$V_{out-1} = \sum_{m=1}^{n-1} |i_m - i_{m+1}| \text{ and } V_{out-2} = \sum_{m=1}^{n-1} |i_m' - i_{m+1}|$$

from the outputs of the photoelectric conversion elements forming said photoelectric conversion element means; calculation circuit means having a first calculation function for calculating $V_{out\text{-}3}=V_{out\text{-}1}+V_{out\text{-}2}$ and a second calculation function for calculating $V_{out\text{-}4}=V_{out\text{-}1}-V_{out\text{-}2}$, so that when $V_{out\text{-}3}$ becomes higher than a predetermined value, different outputs are produced under conditions that $V_{out\text{-}4}>\epsilon_1$, $\epsilon_1 \geq V_{out\text{-}4} \geq \epsilon_2$, and $\epsilon_2>V_{out\text{-}4}$; and a display means for effectuating different displays according to said different outputs, wherein: n is the number of said photoelectric conversion elements forming each of said two photoelectric conversion element groups, m is a discrete number of a photoelectric conversion element, i is the output of a photoelectric conversion element in one of said two photoelectric conversion element groups, i' is the output of a photoelectric conversion element the second photoelectric conversion group and $\epsilon_1$ and $\epsilon_2$ are predetermined constants.

2. The system of claim 1 wherein said optical means comprises a half mirror.

3. The system of claim 1 wherein said optical means comprises a total reflection mirror receiving a single image from said photographing lens, said total reflection lens having a half mirror in the central portion thereof, and a half mirror receiving said image and dividing into two images.

4. The system of claims 1 or 2 wherein said optical member comprises a wedge type prism receiving one of said two images from said optical means.

5. The system of claim 4 wherein said two images are displaced in opposite directions from each other and wherein said optical member comprises a second wedge type prism receiving the second of said two images, said prisms being inclined in opposite directions.

6. The system of claim 1 wherein said photoelectric conversion elements comprise an array of self scanning type image sensors.

7. The system of claim 1 wherein said photoelectric conversion elements comprise an array of photo-diodes.

8. The system of claim 1 wherein said photoelectric conversion elements comprise an array of photo transistors.

9. The system of claim 1 wherein said circuit means for calculating $V_{out\text{-}1}$ and $V_{out\text{-}2}$ comprises a differential circuit receiving the electrical output signals from said two groups, an absolute value circuit receiving the output of said differential circuit and, an integrator for integrating the output of said absolute value circuit.

10. The system of claims 1 and 9 further comprising first and second sample and hold circuits to store signals representing $V_{out\text{-}1}$ and $V_{out\text{-}2}$, and control circuit means for actuation of respective sample and hold circuits.

11. The system of claim 10 wherein said calculation circuit means comprises an addition circuit to perform said first calculation function and a differential circuit to perform said second calculation function.

12. The system of claim 11 further comprising a third sample and hold circuit receiving the output of said differential circuit.

13. The system of claim 1 wherein said calculation circuit means comprises an addition circuit to perform said first calculation function and a differential circuit to perform said second calculation function.

14. The system of claim 1 wherein said display means comprises a first display element indicative of proper focus, a second display element to indicate an out of focus condition of a first type and a third display elemnt to indicate an out of focus condition of a second type.

15. The system of claim 14 wherein said first display is actuated when $\epsilon_1 = V_{out\text{-}4} = \epsilon_2$.

16. The system of claims 14 or 15 wherein said second display is actuated when $V_{out\text{-}4}>\epsilon_1$.

17. The system of claim 16 wherein said third display is actuated when $\epsilon_2>V_{out\text{-}4}$.

18. The system of claim 14 wherein said second and third display elements comprise two arrows indicating opposite senses of rotation said arrows providing an indication of the direction of rotation of said lens to properly focus said object.

19. The system of claims 1, 13 or 14 further comprising logic means interposed between said display means and said calculation means.

20. The system of claim 1 further comprising control means to control the operation of said circuit means for calculating the outputs $V_{out\text{-}1}$ and $V_{out\text{-}2}$.

21. The system of claim 20 wherein said circuit means for calculating $V_{out\text{-}1}$ and $V_{out\text{-}2}$ comprises a differential circuit receiving the electrical output signals from said two groups, an absolute value circuit receiving circuit receiving the output of said differential circuit and, an integrator for integrating the output of said absolute valve circuit and wherein said control means controls operation of said integrator.

* * * * *